United States Patent
Maltseff et al.

(10) Patent No.: US 8,488,510 B2
(45) Date of Patent: *Jul. 16, 2013

(54) STOCHASTIC COMMUNICATION PROTOCOL METHOD AND SYSTEM FOR RADIO FREQUENCY IDENTIFICATION (RFID) TAGS BASED ON COALITION FORMATION, SUCH AS FOR TAG-TO-TAG COMMUNICATION

(75) Inventors: Paul A. Maltseff, Edmonds, WA (US); Steven Winter, Everett, WA (US); Pavel Nikitin, Seattle, WA (US); Venkata Kodukula, Bothell, WA (US); Elena Erosheva, Seattle, WA (US)

(73) Assignee: Intermec IP Corp., Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,367

(22) Filed: May 15, 2012

(65) Prior Publication Data

US 2012/0229259 A1    Sep. 13, 2012

Related U.S. Application Data

(63) Continuation of application No. 12/067,554, filed as application No. PCT/US2006/036801 on Sep. 21, 2006, now Pat. No. 8,199,689.

(60) Provisional application No. 60/719,102, filed on Sep. 21, 2005.

(51) Int. Cl.
    *H04H 20/71* (2008.01)

(52) U.S. Cl.
    USPC ........ 370/312; 370/285; 455/446; 455/552.1; 455/566

(58) Field of Classification Search
    USPC ................ 370/312, 285; 455/446, 552.1, 566
    See application file for complete search history.

(56) References Cited

U.S. PATENT DOCUMENTS

| 836,531 A | 11/1906 | Pickard |
| 837,616 A | 12/1906 | Dunwoody |
| 3,710,337 A | 1/1973 | Grant |

(Continued)

FOREIGN PATENT DOCUMENTS

| DE | 3330261 | 3/1985 |
| EP | 0 595 549 A2 | 5/1994 |

(Continued)

OTHER PUBLICATIONS

U.S. Appl. No. 09/328,028, filed Jun. 8, 1999, Wiklof et al.

(Continued)

*Primary Examiner* — Wayne Cai
*Assistant Examiner* — Chuck Huynh
(74) *Attorney, Agent, or Firm* — Seed IP Law Group PLLC (57) ABSTRACT

Data carriers (such as RFID tags) are formed into clusters of data carriers. Each cluster has at least one bridge data carrier that can communicate with a bridge data carrier of another cluster, thereby allowing data carriers in each cluster to communicate directly or indirectly with each other using a stochastic communication protocol method. Direct tag-to-tag communication capability is provided between data carriers in each cluster and/or between clusters. The data carriers can backscatter and modulate a carrier wave from a source, thereby using the backscattered and modulated carrier wave to convey data to each other.

22 Claims, 6 Drawing Sheets

U.S. PATENT DOCUMENTS

| | | |
|---|---|---|
| 3,852,755 A | 12/1974 | Works et al. |
| 3,949,403 A | 4/1976 | Yoshida et al. |
| 4,056,710 A | 11/1977 | Shepardson et al. |
| 4,079,482 A | 3/1978 | Yeh |
| 4,080,603 A | 3/1978 | Moody |
| 4,307,293 A | 12/1981 | Lazzarotti et al. |
| 4,344,184 A | 8/1982 | Edwards |
| 4,354,101 A | 10/1982 | Hester et al. |
| 4,385,231 A | 5/1983 | Mizutani et al. |
| 4,443,794 A | 4/1984 | Sakurai |
| 4,523,087 A | 6/1985 | Benton |
| 4,562,102 A | 12/1985 | Rabuse et al. |
| 4,567,361 A | 1/1986 | Rosenthal |
| 4,575,621 A | 3/1986 | Dreifus |
| 4,589,144 A | 5/1986 | Namba |
| 4,728,784 A | 3/1988 | Stewart |
| 4,742,567 A | 5/1988 | Ohe et al. |
| 4,782,221 A | 11/1988 | Brass et al. |
| 4,785,451 A | 11/1988 | Sako et al. |
| 4,786,792 A | 11/1988 | Pierce et al. |
| 4,792,910 A | 12/1988 | Lange |
| 4,794,239 A | 12/1988 | Allais |
| 4,810,867 A | 3/1989 | Speicher |
| 4,816,839 A | 3/1989 | Landt |
| 4,823,311 A | 4/1989 | Hunter et al. |
| 4,827,395 A | 5/1989 | Anders et al. |
| 4,841,128 A | 6/1989 | Gröttrup et al. |
| 4,853,705 A | 8/1989 | Landt |
| 4,855,581 A | 8/1989 | Mertel et al. |
| 4,915,519 A | 4/1990 | Afzali-Ardakani et al. |
| 4,916,296 A | 4/1990 | Streck |
| 4,980,544 A | 12/1990 | Winter |
| 5,047,860 A | 9/1991 | Rogalski |
| 5,075,691 A | 12/1991 | Garay et al. |
| 5,095,382 A | 3/1992 | Abe |
| 5,097,263 A | 3/1992 | Delpech et al. |
| 5,097,484 A | 3/1992 | Akaiwa |
| 5,101,200 A | 3/1992 | Swett |
| 5,128,526 A | 7/1992 | Yoshida |
| 5,142,292 A | 8/1992 | Chang |
| 5,160,023 A | 11/1992 | Adams et al. |
| 5,184,005 A | 2/1993 | Ukai et al. |
| 5,204,515 A | 4/1993 | Yoshida |
| 5,216,233 A | 6/1993 | Main et al. |
| 5,216,419 A | 6/1993 | Fujisaka et al. |
| 5,218,689 A | 6/1993 | Hotle |
| 5,220,335 A | 6/1993 | Huang |
| 5,243,655 A | 9/1993 | Wang |
| 5,267,800 A | 12/1993 | Petteruti et al. |
| 5,278,395 A | 1/1994 | Benezet |
| 5,280,159 A | 1/1994 | Schultz et al. |
| 5,298,731 A | 3/1994 | Ett |
| 5,300,761 A | 4/1994 | Kasahara et al. |
| 5,315,511 A | 5/1994 | Matsuura et al. |
| 5,324,922 A | 6/1994 | Roberts |
| 5,324,927 A | 6/1994 | Williams |
| 5,341,381 A | 8/1994 | Fuller |
| 5,380,998 A | 1/1995 | Bossen et al. |
| 5,382,778 A | 1/1995 | Takahira et al. |
| 5,382,784 A | 1/1995 | Eberhardt |
| 5,387,783 A | 2/1995 | Mihm et al. |
| 5,389,770 A | 2/1995 | Ackley |
| 5,420,403 A | 5/1995 | Allum et al. |
| 5,430,441 A | 7/1995 | Bickley et al. |
| 5,434,401 A | 7/1995 | Bauser |
| 5,434,572 A | 7/1995 | Smith |
| 5,448,110 A | 9/1995 | Tuttle et al. |
| 5,463,643 A | 10/1995 | Gaskins et al. |
| 5,466,501 A | 11/1995 | Logan et al. |
| 5,479,515 A | 12/1995 | Longacre, Jr. |
| 5,484,997 A | 1/1996 | Haynes |
| 5,489,908 A | 2/1996 | Orthmann et al. |
| 5,497,701 A | 3/1996 | Uland |
| 5,499,397 A | 3/1996 | Wadin et al. |
| 5,514,858 A | 5/1996 | Ackley |
| 5,521,601 A | 5/1996 | Kandlur et al. |
| 5,521,815 A | 5/1996 | Rose, Jr. |
| 5,528,222 A | 6/1996 | Moskowitz et al. |
| 5,536,924 A | 7/1996 | Ackley |
| 5,539,191 A | 7/1996 | Ackley |
| 5,548,110 A | 8/1996 | Storch et al. |
| 5,550,365 A | 8/1996 | Klancnik et al. |
| 5,550,547 A | 8/1996 | Chan et al. |
| 5,552,591 A | 9/1996 | Bossen et al. |
| 5,553,041 A | 9/1996 | Inagawa et al. |
| 5,553,084 A | 9/1996 | Ackley et al. |
| 5,554,974 A | 9/1996 | Brady et al. |
| 5,557,092 A | 9/1996 | Ackley et al. |
| 5,560,293 A | 10/1996 | Boreali et al. |
| 5,563,402 A | 10/1996 | Reddersen et al. |
| 5,565,847 A | 10/1996 | Gambino et al. |
| 5,566,441 A | 10/1996 | Marsh et al. |
| 5,588,005 A | 12/1996 | Ali et al. |
| 5,594,228 A | 1/1997 | Swartz et al. |
| 5,612,531 A | 3/1997 | Barkan |
| 5,619,027 A | 4/1997 | Ackley |
| 5,629,508 A | 5/1997 | Findley, Jr. et al. |
| 5,640,002 A | 6/1997 | Ruppert et al. |
| 5,659,431 A | 8/1997 | Ackley |
| 5,673,037 A | 9/1997 | Cesar et al. |
| 5,712,643 A | 1/1998 | Skladany |
| 5,723,853 A | 3/1998 | Longacre, Jr. et al. |
| 5,729,201 A | 3/1998 | Jahnes et al. |
| 5,761,219 A | 6/1998 | Maltsev |
| 5,761,529 A | 6/1998 | Raji et al. |
| 5,763,867 A | 6/1998 | Main et al. |
| 5,767,498 A | 6/1998 | Heske, III et al. |
| 5,777,310 A | 7/1998 | Liu et al. |
| 5,777,561 A | 7/1998 | Chieu et al. |
| 5,782,496 A | 7/1998 | Casper et al. |
| 5,786,626 A | 7/1998 | Brady et al. |
| 5,788,796 A | 8/1998 | Look et al. |
| 5,805,082 A | 9/1998 | Hassett |
| 5,811,781 A | 9/1998 | Ackley |
| 5,812,065 A | 9/1998 | Schrott et al. |
| 5,818,031 A | 10/1998 | Endoh |
| 5,840,657 A | 11/1998 | Mehta et al. |
| 5,842,118 A | 11/1998 | Wood, Jr. |
| 5,874,896 A | 2/1999 | Lowe et al. |
| 5,874,902 A | 2/1999 | Heinrich et al. |
| 5,923,305 A | 7/1999 | Sadler et al. |
| 5,942,987 A | 8/1999 | Heinrich et al. |
| 5,956,649 A | 9/1999 | Mitra et al. |
| 5,972,156 A | 10/1999 | Brady et al. |
| 5,973,598 A | 10/1999 | Beigel |
| 5,973,600 A | 10/1999 | Mosher, Jr. |
| 5,979,773 A | 11/1999 | Findley, Jr. et al. |
| 5,982,904 A | 11/1999 | Eghtesadi et al. |
| 5,993,093 A | 11/1999 | Schoennauer et al. |
| 6,003,775 A | 12/1999 | Ackley |
| 6,012,638 A | 1/2000 | Ackley et al. |
| 6,019,865 A | 2/2000 | Palmer et al. |
| 6,024,289 A | 2/2000 | Ackley |
| 6,025,784 A | 2/2000 | Mish |
| 6,076,064 A | 6/2000 | Rose, Jr. |
| 6,078,259 A | 6/2000 | Brady et al. |
| 6,081,718 A | 6/2000 | Ando et al. |
| 6,092,133 A | 7/2000 | Erola et al. |
| 6,097,301 A | 8/2000 | Tuttle |
| 6,104,311 A | 8/2000 | Lastinger |
| 6,118,379 A | 9/2000 | Kodukula et al. |
| 6,123,796 A | 9/2000 | Kathmann et al. |
| 6,149,059 A | 11/2000 | Ackley |
| 6,180,198 B1 | 1/2001 | Bond |
| 6,210,515 B1 | 4/2001 | Boreali et al. |
| 6,243,013 B1 | 6/2001 | Duan et al. |
| 6,246,326 B1 | 6/2001 | Wiklof et al. |
| 6,259,372 B1 | 7/2001 | Taranowski et al. |
| 6,272,242 B1 | 8/2001 | Saitoh et al. |
| 6,278,413 B1 | 8/2001 | Hugh et al. |
| 6,285,342 B1 | 9/2001 | Brady et al. |
| 6,286,763 B1 | 9/2001 | Reynolds et al. |
| 6,321,986 B1 | 11/2001 | Ackley |
| 6,327,972 B2 | 12/2001 | Heredia et al. |
| 6,360,208 B1 | 3/2002 | Ohanian |
| 6,371,375 B1 | 4/2002 | Ackley et al. |
| 6,409,401 B1 | 6/2002 | Petteruti et al. |

| | | |
|---|---|---|
| 6,422,476 B1 | 7/2002 | Ackley |
| 6,512,482 B1 | 1/2003 | Nelson et al. |
| 6,570,386 B2 | 5/2003 | Goldstein |
| 6,585,159 B1 | 7/2003 | Meier et al. |
| 6,585,437 B1 | 7/2003 | Wiklof et al. |
| 6,593,853 B1 | 7/2003 | Barrett et al. |
| 6,664,897 B2 | 12/2003 | Pape et al. |
| 6,677,852 B1 | 1/2004 | Landt |
| 6,707,376 B1 | 3/2004 | Patterson et al. |
| 6,899,476 B1 | 5/2005 | Barrus et al. |
| 6,917,291 B2 | 7/2005 | Allen |
| 6,933,848 B1 | 8/2005 | Stewart et al. |
| 6,967,577 B2 | 11/2005 | Taylor et al. |
| 7,071,825 B2 | 7/2006 | VoBa |
| 7,121,467 B2 | 10/2006 | Winter et al. |
| 7,259,676 B2 | 8/2007 | Knadle, Jr. et al. |
| 7,323,977 B2 | 1/2008 | Kodukula et al. |
| 7,323,989 B2 | 1/2008 | Allen |
| 7,413,124 B2 | 8/2008 | Frank et al. |
| 7,423,539 B2 | 9/2008 | Hyde et al. |
| 7,499,648 B2 | 3/2009 | Draper et al. |
| 7,528,728 B2 | 5/2009 | Oliver et al. |
| 7,546,955 B2 | 6/2009 | Marty et al. |
| 7,579,955 B2 | 8/2009 | Pillai |
| 7,667,589 B2 | 2/2010 | Desmons et al. |
| 2003/0012168 A1 | 1/2003 | Elson et al. |
| 2003/0218069 A1 | 11/2003 | Meier et al. |
| 2004/0166807 A1 | 8/2004 | Vesikivi et al. |
| 2005/0052279 A1 | 3/2005 | Bridgelall |
| 2005/0057370 A1 | 3/2005 | Warrior et al. |
| 2005/0120260 A1 | 6/2005 | Suzuki et al. |
| 2005/0212674 A1 | 9/2005 | Desmons et al. |
| 2006/0022801 A1 | 2/2006 | Husak et al. |
| 2006/0028343 A1 | 2/2006 | Taylor et al. |
| 2006/0267731 A1* | 11/2006 | Chen ............................ 340/10.1 |
| 2007/0017983 A1 | 1/2007 | Frank et al. |
| 2007/0024423 A1 | 2/2007 | Nikitin et al. |
| 2007/0081671 A1 | 4/2007 | Ross, Jr. et al. |
| 2007/0194929 A1 | 8/2007 | Wagner et al. |
| 2007/0229261 A1 | 10/2007 | Zimmerman et al. |
| 2007/0296582 A1 | 12/2007 | Rofougaran |
| 2007/0296583 A1 | 12/2007 | Rofougaran |
| 2008/0036605 A1 | 2/2008 | Pillai |
| 2008/0188209 A1 | 8/2008 | Dorogusker et al. |
| 2008/0231451 A1 | 9/2008 | Kamel |
| 2009/0272812 A1 | 11/2009 | Marty et al. |

FOREIGN PATENT DOCUMENTS

| | | |
|---|---|---|
| EP | 0667592 A1 | 8/1995 |
| EP | 0 718 912 A1 | 6/1996 |
| FR | 2760209 | 9/1998 |
| JP | 3113673 A | 5/1991 |
| JP | 1040329 A | 2/1998 |
| JP | 11-221948 | 8/1999 |
| WO | 95/12863 | 5/1995 |
| WO | 96/13803 | 5/1996 |
| WO | 98/47101 | 10/1998 |
| WO | 2007/035863 | 3/2007 |

OTHER PUBLICATIONS

U.S. Appl. No. 09/375,815, filed Aug. 17, 1999, Ackley.
U.S. Appl. No. 09/375,913, filed Aug. 17, 1999, Ackley.
U.S. Appl. No. 60/719,102, filed Sep. 21, 2005, Maltseff et al.
U.S. Appl. No. 60/830,020, filed Jul. 11, 2006, Ackley et al.
U.S. Appl. No. 60/834,314, filed Jul. 28, 2006, Ackley et al.
"Alien Squiggle Family of EPC RFID Tags," Alien Technology Corporation, 2005, pp. 1-2.
"Bar Code Compression Decompression," IBM Technical Disclosure Bulletin 32:12, May 1990, pp. 288-290.
"Information Technology: Transfer Syntax for High Capacity ADC Media," International Standard ISO/IEC 15434, First Edition, Oct. 1, 1999.
"Information Technology—Radio Frequency Identification for Item Management: Part 6: Parameters for Air Interface Communications at 860 MHz to 960 MHz," ISO/IEC 18000-6, First Edition, Aug. 15, 2004.
"Information Technology—Automatic Identification and Data Capture Techniques—Bar Code Symbology Specifications," International Standard ISO/IEC 15438, First Edition, Sep. 15, 2001.
"International Technical Standard: Extended Channel Interpretations: Part 1: Identification Schemes and Protocol," AIM Publication ITS/04-001 (May 24, 2004).
"International Symbology Specification—93i," AIM Publication ITS/99-004, Nov. 5, 1999.
"Radio-Frequency Identification of Animals—Code Structure," ISO 11784, Second Edition, Aug. 15, 1996.
Technical Specification: Aircraft-Integrated Data Processing Materials Management—Bar Coding, ISO/TS 21849, First Edition, Jul. 1, 2003.
AIM International, Inc., "International Symbology Specification—Data Matrix," May 8, 1997, 95 pages.
AIM International, Inc., "International Symbology Specification—MaxiCode," May 8, 1997, 44 pages.
AIM International, Inc., "International Symbology Specification MaxiCode," pp. 1-44.
AIM International, Inc., "International Technical Specification—Symbology Identifiers", Jun. 18, 1998, Document Version 1.0, pp. 1-17.
AIM USA, "Understanding 2d Symbologies, A Detailed Overview and Technical Introduction," Copyright 1999, pp. 1-49.
AIM USA, "Uniform Symbology Specification Codabar", American National Standards Institute, Inc. Approved Aug. 16, 1995, pp. 1-11.
AIM USA, "Uniform Symbology Specification Code 128," American National Standards Institute, Inc., Approved Aug. 16, 1995, pp. 1-12.
AIM USA, "Uniform Symbology Specification Code 16K," American National Standards Institute, Inc., Approved Aug. 16, 1995, pp. 1-17.
AIM USA, "Uniform Symbology Specification Code 39", American National Standards Institute, Inc. Approved Aug. 16, 1995, pp. 1-11.
AIM USA, "Uniform Symbology Specification Code 49," American National Standards Institute, Inc., Approved Aug. 16, 1995, pp. 1-26.
AIM USA, "Uniform Symbology Specification Code 93," Apr. 1993, pp. 1-10.
AIM USA, "Uniform Symbology Specification Code 93", American National Standards Institute, Inc. Approved Aug. 16, 1995, pp. 1-10.
AIM USA, "Uniform Symbology Specification Code One," Jul. 1994, pp. 1-32.
AIM USA, "Uniform Symbology Specification Interleaved 2-of-5", American National Standards Institute, Inc. Approved Aug. 16, 1995, pp. 1-11.
AIM USA, "Uniform Symbology Specification PDF417," Jul. 1994, pp. 1-34. International Product Code (IPC)-2D Symbology Specification, Version: Sep. 7, 1997, pp. 1-7.
Alphanumeric Data Compaction, Rev. C., Intermec Corporation, Everett, Washington, 1992, 6 pages.
Arthur, NN81102407 IBM Technical Disclosure Bulletin, Oct. 1981, vol. 24, Issue 5, p. 2407.
Atmel Microcontroller with Transponder Interface manual, U9280M-H, 2005.
"AXCESS: Radio Frequency Identification Overview," http://www.axcessinc.com/prod_rfidoverview.php, download date Sep. 13, 2006, pp. 1-3.
Bar Code Print Quality—Guideline, ANSI X3.182-1990, pp. 1-29.
Businessworld, Cigarette firms complain barcode requirement is 'too costly', Nov. 1998.
Codablock F (128), Bar Coding—Symbology Specification—Codablock, ICS International AG, 1993, pp. 1-44.
Dallas Semiconductor Corporation, Book of DS199x Touch Memory Standards, 1992.
Dallas Semiconductor Corporation, Dallas Takes the Memory Out of the Computer, Feb. 1993.
Dallas Semiconductor, "50 Ways To Touch Memory," Second Edition, Oct. 1992, 93 pages.
Dallas Semiconductor, "50 Ways To Touch Memory," Third Edition, Aug. 1994, 95 pages.
Extended Channel Interpretation (ECI) Assignments, Release 2, ECI Assignments, Aug. 1995, pp. 1-13.
Information processing—8-bit single-byte coded graphic character sets, Part 1: Latin alphabet No. 1, ISO 8859-1:1987 (E), pp. 1-7.

Information processing—8-bit single-byte coded graphic character sets, Part 4: Latin alphabet No. 4, ISO 8859-4:1988 (E), pp. 1-5.

International Product Code (IPC)-13 Symbology Specification (preliminary), Version: Sep. 4, 1997, 99.1-10.

International Product Code (IPC)-14 Symbology Specification (preliminary), Version: Sep. 1, 1997, pp. 1-9.

IPC-2D Symbology Specification, Sep. 7, 1997, pp. 1-7.

K.V. Rao et al., "Antenna Design for UHF RFID Tags: A Review and a Practical Application," *IEEE Transactions on Antennas and Propagation,* vol. 53, No. 12, Dec. 2005, pp. 3870-3876.

Kirman et al., "Stochastic Communication and Coalition Formation," Econometrica, vol. 54, No. 1, Jan. 1986, pp. 129-138.

Maltseff et al., Synchronization of Adaptive Self-Configuring Wireless Network of Transponders U.S. Appl. No. 60/610,759, filed Dec. 1, 2004, 5 pages.

Material Handling Engineering, Going with the Flow: The 1998 Roundtable Report, Dec. 1998.

NN86055595 IBM Technical Disclosure Bulletin, May 1986, vol. 28, Issue 12, p. 5595-5596.

Palmer, R.C., "Symbologies," The Bar Code Book, 2d ed., Chapter 4, Helmers Publishing, Inc., New Hampshire, 1991, pp. 15-59.

"Radio-Frequency Identification of Animals—Code Structure" ISO 11784, Second Edition, Aug. 15, 1996.

"Radio-Frequency Identification of Animals—Code Structure—Amendment 1," ISO 11784, Second Edition, Aug. 15, 1996, Amendment 1, Nov. 14, 2004.

"Radio-Frequency Identification of Animals—Technical Concept," ISO 11785, First Edition, Oct. 15, 1996.

"RFID Tags by RFIDSupplyChain.com," URL: http://www.rfidsupplychain.com/Categories.bok?category=RFID+Tags, 2006, download date Jun. 22, 2006, pp. 1-3.

"Smart Dust: Autonomous sensing and communication in a cubic millimeter," http://robotics.eecs.berkeley.edu/~pister/SmartDust/, download date Sep. 13, 2006, pp. 1-6.

Schuessler, Rick, Using Extended Channel Interpretations (ECI's) for International Character Set Standardization, Scan-Tech Proceedings, Chicago, Nov. 1996, pp. 294-305.

Straw, R., et al., *The ARRL Handbook—For Radio Amateurs,* 76th ed., The American Radio Relay League, Newington, CT, 1999, chapter 20, "Antennas & Projects," pp. 20.31-20.37.

The Unicode Standard Worldwide Character Encoding, Version 1, vol. 1, The Unicode Consortium, Addison-Wesley Publishing Company, Inc., Massachusetts, 1991, pp. 1-6, and 340.

Walker, Nathan, "ASCII-based compaction eases bar-code decoder's work," Electronic Design 30(22), 163-166, Oct. 1982.

Wang, "PDF417 Specification," Symbol Technologies, Inc., 1991.

* cited by examiner

| Transmitted RF CW EIRP | 36 dBm |
|---|---|
| Free space path loss from CW source to tag 1 (4 ft distance at 915 MHz) | −33 dB |
| Tag 1 backscattering modulation loss | −6 dB |
| Coupling loss between tag1 and tag2 (tags are in close proximity) | −6 dB |
| Backscattered differential modulated power received by tag 2 | −9 dBm |
| Minimum power required | −10 dBm |

STOCHASTIC COMMUNICATION PROTOCOL METHOD AND SYSTEM FOR RADIO FREQUENCY IDENTIFICATION (RFID) TAGS BASED ON COALITION FORMATION, SUCH AS FOR TAG-TO-TAG COMMUNICATION

CROSS REFERENCE TO RELATED APPLICATION

This application is a continuation of U.S. patent application Ser. No. 12/067,554, filed Mar. 20, 2008 now issued as U.S. Pat. No. 8,199,689, which is a U.S. national stage application filed under 35 U.S.C. §371 of International Patent Application PCT/US2006/036801, accorded an international filing date of Sep. 21, 2006, which claims the benefit of and priority under 35 U.S.C. §119(e) from U.S. Provisional Patent Application Ser. No. 60/719,102, filed Sep. 21, 2005, all of which are incorporated herein by reference in their entirety.

TECHNICAL FIELD

This disclosure generally relates to the field of automatic data collection (ADC), for example, data acquisition via radio frequency identification (RFID) tags and readers. More particularly but not exclusively, the present disclosure relates to communication between data carriers such as RFID tags.

BACKGROUND INFORMATION

The ADC field includes a variety of different types of ADC data carriers and ADC readers operable to read data encoded in such data carriers. For example, data may be encoded in machine-readable symbols, such as barcode symbols, area or matrix code symbols, and/or stack code symbols. Machine-readable symbols readers may employ a scanner and/or imager to capture the data encoded in the optical pattern of such machine-readable symbols. Other types of data carriers and associated readers exist, for example magnetic stripes, optical memory tags, and touch memories.

Other types of ADC carriers include RFID tags that may store data in a wirelessly accessible memory, and may include a discrete power source (i.e., an active RFID tag), or may rely on power derived from an interrogation signal (i.e., a passive RFID tag). RFID readers typically emit a radio frequency (RF) interrogation signal that causes the RFID tag to respond with a return RF signal encoding the data stored in the memory.

Identification of an RFID tag generally depends on RF energy produced by a reader or interrogator arriving at the RFID tag and returning to the reader. Multiple protocols exist for use with RFID tags. These protocols may specify, among other things, particular frequency ranges, frequency channels, modulation schemes, security schemes, and data formats.

Many ADC systems that use RFID tags employ an RFID reader in communication with one or more host computing systems that act as central depositories to store and/or process and/or share data collected by the RFID reader. In many applications, wireless communications is provided between the RFID reader and the host computing system. Wireless communications allow the RFID reader to be mobile, may lower the cost associated with installation of an ADC system, and permit flexibility in reorganizing a facility, for example a warehouse.

RFID tags typically include a semiconductor device having the memory, circuitry, and one or more conductive traces that form an antenna. Typically, RFID tags act as transponders, providing information stored in the memory in response to the RF interrogation signal received at the antenna from the reader or other interrogator. Some RFID tags include security measures, such as passwords and/or encryption. Many RFID tags also permit information to be written or stored in the memory via an RF signal.

RFID tags are generally used to provide information about the specific objects on which the RFID tags are attached. For example, RFID tags may store data that provide the identification and description of products and goods, the identity of an animal or an individual, or other information pertaining to the objects on which the RFID tags are attached.

Some types of RFID tags are capable of communicating with each other, thereby allowing formation of an RFID network. However, direct tag-to-tag communication in such RFID networks is currently possible only between specially designed battery-powered active RFID tags, such as the products available from Axcess Inc. and/or the devices used in the "Smart Dust: Autonomous sensing and communication in a cubic millimeter" project described in http://robotics.eecs.berkeley.edu/~pister/SmartDust/. Such active RFID tags and devices can be unduly complex in design and expensive, especially in situations requiring a large number of tags where the batteries have to be continuously monitored, maintained, and replaced in order to ensure that sufficient power is available to meet operational requirements.

Moreover, traditional client-server applications and methods are not particularly suited for RFID networks that need to be capable of handling very large numbers of interconnected RFID tags in an ad hoc manner. In addition, the RFID tags may dynamically join or leave the RFID network due to a number of reasons, such as exhaustion or lost of power, signal attenuation, physical destruction, etc. The dynamic and generally random nature of the interconnection between and presence of RFID tags, combined with a potentially massive number of distributed RFID tags, as a practical matter preclude the use of traditional applications and methods for communications.

As an additional consideration, the routing table approach used in wired networks and in wireless networks (such as 802.11, ZigBee, Bluetooth, etc. wireless systems) requires a relatively large amount of memory, which is not readily available in RFID tags and therefore cannot be conveniently used in RFID networks. Furthermore, the traditional communication applications and methods are generally unsuitable in RFID networks where the complexity of interconnections between RFID tags requires such communication applications/methods to address scalability, pervasiveness, spatial distribution, power awareness, and/or other issues.

BRIEF SUMMARY

One aspect provides a method that includes forming coalitions of clusters of distributed data carriers. For each of said clusters, the method identifies a bridge data carrier that is capable to link with a bridge data carrier of another of said clusters, and enables communication between data carriers of the clusters. At least some of said data carriers include batteryless passive data carriers.

BRIEF DESCRIPTION OF THE SEVERAL VIEWS OF THE DRAWINGS

Non-limiting and non-exhaustive embodiments are described with reference to the following drawings, wherein like reference numerals refer to like parts throughout the various views unless otherwise specified. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, numerous specific details are given to provide a thorough understanding of embodiments. One skilled in the relevant art will recognize, however, that the embodiments can be practiced without one or more of the specific details, or with other methods, components, materials, etc. In other instances, well-known structures, materials, or operations associated with RFID tags and RFID readers, computer and/or telecommunications networks, and/or computing systems are not shown or described in detail to avoid obscuring aspects of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

As an overview, data carriers (such as RFID tags) are formed into clusters of data carriers. Each cluster has at least one bridge data carrier that can communicate with a bridge data carrier of another cluster, thereby allowing data carriers in each cluster to communicate directly or indirectly with each other using a stochastic communication protocol method.

The clusters can be formed dynamically based on various criteria, such as the distance associated with candidate data carriers, such as a distance between a candidate data carrier and a centrally located data carrier in a cluster. Moreover, the size, shape, number of data carriers, etc. for each cluster can vary dynamically from one cluster to another.

Another embodiment relates to a synchronization of formed coalitions of clusters of distributed data carriers to sustain a collection of data of interest in a desired manner.

Embodiments further provide techniques for direct tag-to-tag communication between data carriers (such as passive RFID tags) in each cluster and/or between clusters. Such embodiments allow such data carriers to backscatter and modulate a carrier wave from a source, thereby using the backscattered and modulated carrier wave to convey data to each other.

The stochastic communication protocol method of one embodiment includes the following elements:

(a) forming stochastic coalitions of clusters from irregularly or otherwise randomly distributed RFID tags;

(b) identifying bridge tags for each cluster;

(c) synchronizing cluster formations; and (d) enabling distribution of information between RFID tags and a data collection device.

Figure 1:
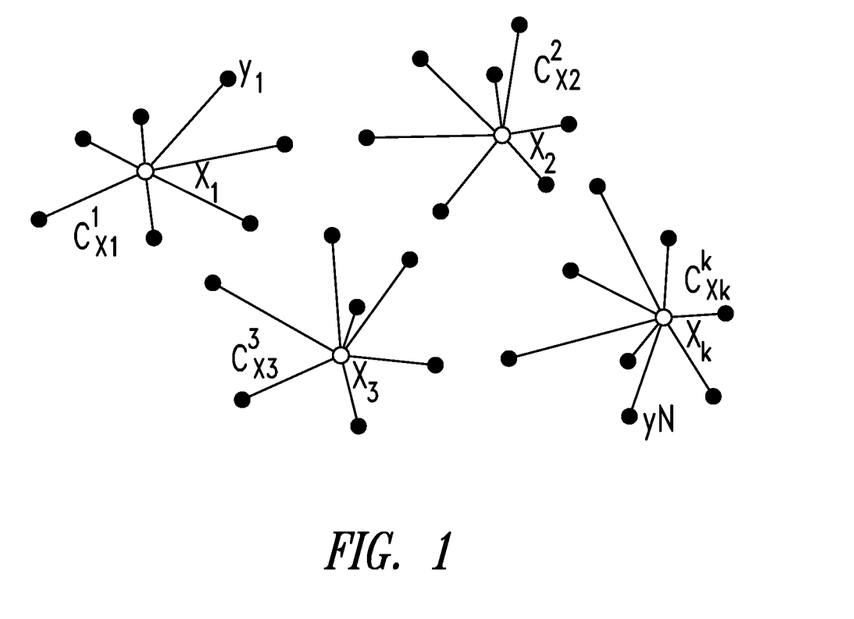
FIG. 1 is a schematic diagram showing a formation of clusters of distributed RFID tags according to an embodiment.

FIG. 1 shows a non-limiting example of the first element (a) of such a method, namely formation of stochastic coalitions of clusters from distributed RFID tags. In particular, the diagram of FIG. 1 shows formation of a plurality of clusters of data carriers, such as a set of RFID tags $Y=\{y_1, y_2, y_3, \ldots, y_N\}$, according to one embodiment. For the sake of simplicity of explanation hereinafter and unless otherwise specified, the data carriers will be described in the context of RFID tags. In other embodiments, it is appreciated that the data carriers can comprise acoustical tags, other types of non-RFID tags, and/or a combination of RFID tags and non-RFID tags.

Each of the clusters in FIG. 1 are denoted by $C^i$, where $1 \leq i < k$ and $k < N$. Each cluster C includes an RFID tag $x_i$, where $1 \leq i \leq k$. In one embodiment, the RIFD tag $x_i$ in each cluster $C^i$ comprises an RFID tag that is located substantially in the center of each cluster. Thus, the cluster $C^1$ has the central RFID tag $x_1$; the cluster $C^2$ has the central RFID tag $x_2$; the cluster $C^3$ has the central RFID tag $x_3$; and so forth up to the cluster $C^k$ having the central RFID tag $x_k$. In another embodiments, the RFID tag $x_i$ need not necessarily be the centrally located RFID tag in each cluster $C^i$.

The various RFID tags Y in FIG. 1 include deployed RFID tags that are affixed to objects. Such objects can include an item, a packaging or label for the item, a container of multiple packaged or unpackaged items, or other type of objects that are capable of having the RFID tags Y attached thereon. Examples of the item can include drugs, toys, food, animals, merchandise, human beings, machinery parts, or other types of animate or inanimate items that can be identified or otherwise represented by the RFID tags Y. In the context of human beings, for example, the item can include an identification card, driver's license, airline boarding pass, article of clothing, luggage, and so forth. Moreover, the RFID tags Y can be affixed to stationary objects, such as objects placed on an inventory shelf. The RFID tags Y may also be affixed to objects in motion, such as on identification cards carried by persons. The RFID tags may also be affixed to a combination of stationary and in-motion objects, and may further dynamically change in total number N (as well as the total number of RFID tags in each cluster $C^k$) as RFID tags are added or removed from a cluster, run out of power or are otherwise disabled, lost or detached from their respective object, and so forth.

Accordingly in one embodiment, the RFID tags Y in FIG. 1 are randomly distributed in a non-confined area. In another embodiment, the distribution may be less random, for example if the objects having the RFID tags Y affixed thereon are organized uniformly on a shelf or other situation where the distribution of the RFID tags Y is more or less uniform.

The clusters C of FIG. 1 are formed based on the principles of coalition formation in one embodiment. The coalitions (or other form of grouping) of the RFID tags Y of one embodiment define RFID tags as agents that may or may not communicate with each other. Coalitions can be formed between linked agents—thus, a coalition can encompass two (or more) clusters that are able to communicate with each other; a coalition can encompass two (or more) RFID tags in different clusters that can communicate with each other; and/or a coalition can encompass two (or more) RFID tags in a same cluster that can communicate with each other. In a first type of communication in an embodiment, RFID tags directly communicate with each other in order to be in the same coalition. In a second type of communication in an embodiment, RFID tags may communicate indirectly with each other through the use of other agents. In one embodiment, the structure of the random coalitions controls the functionality of the coalitions, and the efficiency of communication protocols between RFID tags in effect determines the functionality of the coalitions. Further details of such various embodiments are described in further detail later below. The publication Kirman et al., "Stochastic Communication and Coalition Formation," Econometrica, volume 54, No. 1 (January 1986), pages 129-138 also provides additional details of coalitions that can be implemented by some embodiments and is incorporated by reference herein in its entirety.

Figure 2:
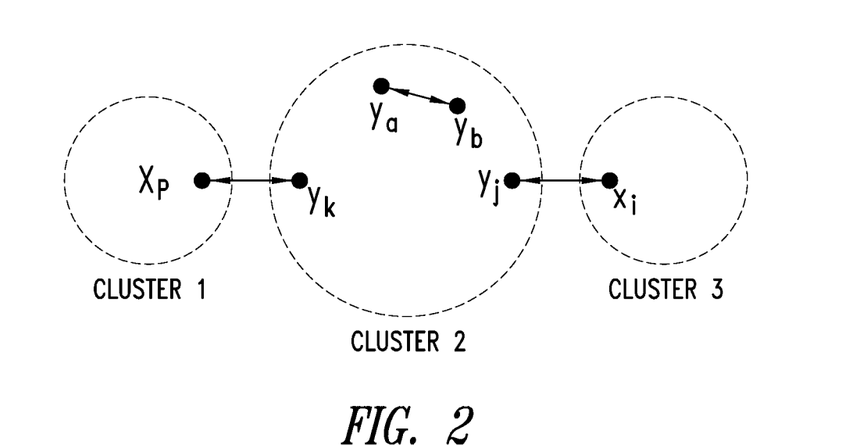
FIG. 2 is a schematic diagram showing use of bridge tags to implement communication between clusters according to an embodiment.

In mathematical terms for one embodiment, the set of RFID tags $Y=\{y_1, y_2, y_3, \ldots, y_N\}$ is divided into k subsets (clusters C), with the RFID tags $x_i$ being centrally located tags in each cluster, where $1 \leq i \leq k$ and $k<N$. Under these conditions, the following criterion will have a maximum value:

$$\sum_{x_i} \sum_{y_j \in S(x_i)} \mu(x_i, y_j)$$

where $S(x_i)$ is a set of RFID tags that belong to a cluster $C^i$ with the RFID tag $x_i$ as a central RFID tag, and $\mu(x_i, y_j)$ is some measure of communication quality between tags $x_i$ and $y_j$ (with i and j<N). In one embodiment, the measure of communication quality is based on emitted power, as will be explained with regards to FIG. 2. In other embodiments, the measure of communication quality can be based on additional or alternative factors.

FIG. 2 shows a non-limiting example of the second element (b) of an embodiment of the stochastic communication protocol method, namely identification of bridge RFID tags for each cluster $C^i$. In an embodiment, the identification of bridge RFID tags (e.g., the RFID tags $x_p$, $y_k$, $y_j$, and $x_i$ in FIG. 2) includes identification of RFID tags in every cluster C such that all clusters have links with each other directly or indirectly through intermediate clusters via use of bridge RFID tags.

In the example of FIG. 2, the cluster 1 includes a particular RFID tag $x_p$. The RFID tag $x_p$ may be the central RFID tag or may be some other tag located off-center in the cluster 1. The cluster 2 includes particular RFID tags $y_k$ and $y_j$. The RFID tags $y_k$ or $y_j$ may be the central RFID tag or may be some other tag located off-center in the cluster 2. The cluster 2 also includes other RFID tags $y_a$ and $y_b$ that can communicate with each other, as depicted by the double-headed arrow between the RFID tags $y_a$ and $y_b$. The cluster 3 includes the RFID tag $x_i$. The RFID tag $x_i$ may be the central RFID tag or may be some other tag located off-center in the cluster 3.

In the example of FIG. 2, the RFID tags $x_p$ and $y_k$ are the bridge RFID tags that can communicate with each other (as depicted by the double headed arrow between the RFID tags $x_p$ and $y_k$), thereby allowing other RFID tags in the respective clusters 1 and 2 to indirectly communicating with each other through the bridge RFID tags $x_p$ and $y_k$. Thus, a coalition is formed between the bridge RFID tags $x_p$ and $y_k$, between the clusters 1 and 2, and/or between any RFID tag in cluster 1 with any RFID tag in cluster 1 (via communication with the bridge RFID tags $x_p$ and $y_k$).

Similarly, the RFID tags $y_j$ and $x_i$ are the bridge RFID tags that can communicate with each other (as depicted by the double headed arrow between the RFID tags $y_j$ and $x_i$), thereby allowing other RFID tags in the respective clusters 2 and 3 to indirectly communicating with each other through the bridge RFID tags $y_j$ and $x_i$. Thus, a coalition is formed between the bridge RFID tags $y_j$ and $x_i$, between the clusters 2 and 3, and/or between any RFID tag in cluster 2 with any RFID tag in cluster 3 (via communication with the bridge RFID tags $y_j$ and $x_i$).

In an embodiment, a "bridge zone" in each cluster (e.g., in clusters 1 and 2) is defined by the region where the emitting power of the particular RFID tag $x_p$ of the cluster 1 that is sensed by the particular RFID tag $y_k$ of the cluster 2 exceeds a cumulative power that is sensed by the particular RFID tag $y_k$ from all of the RFID tags in the cluster 1 by some specified threshold value. In some embodiments, the specified threshold value exceeded by the cumulative power is uniform among the various clusters. In another embodiment, the specified threshold value can be different among the various clusters. For instance, the specified threshold value between clusters 1 and 2 can be different than the specified threshold value between clusters 2 and 3.

In an embodiment, a single cluster may have different bridge RFID tags that can be used to bridge with respective different other clusters. Further in an embodiment, a single cluster may have more than one bridge RFID tag to bridge with some other single cluster, and/or may bridge with more than one bridge RFID tag of that other single clusters. Still further in an embodiment, various RFID tags may be designated as backup bridge RFID tags, if a primary bridge RFID tag becomes disabled, is removed from the cluster, or otherwise becomes incapable of operating as a bridge RFID tag.

In yet further embodiments, the identification of bridge RFID tags may change dynamically, as the shape or size of a cluster changes and/or as additional RFID tags are added/removed from the cluster. It is therefore evident from the above that individual RFID tags are capable of communicating with other RFID tags, whether in the same cluster or in some other cluster, by "hopping" from one RFID tag to another communicatively compatible RFID tag in the same cluster and between clusters.

Figure 3:
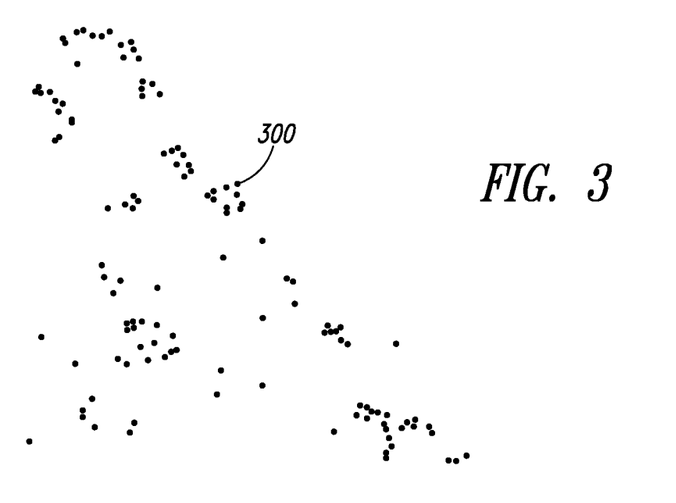
FIGS. 3-4 are schematic diagrams showing formation of clusters based on distances between RFID tags according to an embodiment.
Figure 4:
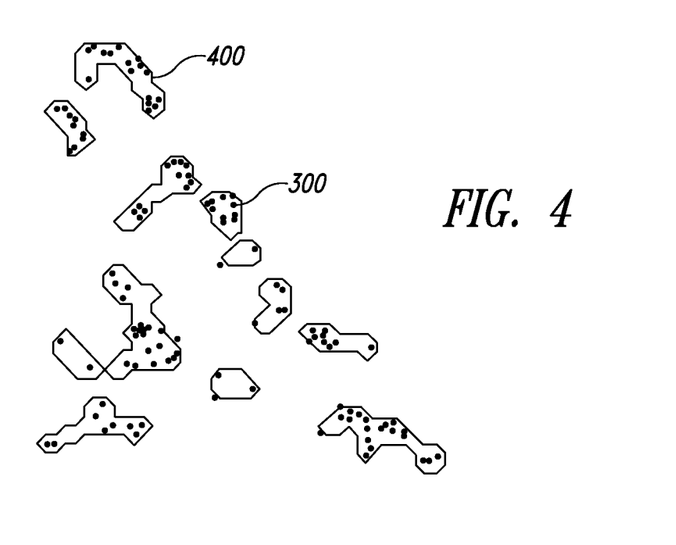

FIGS. 3-4 show an embodiment of a technique for forming clusters based on distances between RFID tags. It is appreciated that formation of clusters based on distances is only one possible technique that can be used. Other embodiments can form clusters based on other alternative or additional factors, such as RFID type, power output, return signal frequency, and so forth.

In FIG. 3, a plurality of RFID tags 300 are distributed over a region. The region over which the RFID tags 300 are distributed can range from a few square inches (or smaller) to perhaps on the order of several square miles. As depicted symbolically in FIG. 3, some RFID tags 300 are located in closer proximity relative to each other as compared to other ones of the RFID tags 300. The particular concentration/density, pattern, location, or other distribution factor of the RFID tags 300 can be completely random, semi-random, specifically arranged, and/or combination thereof.

As depicted in FIG. 4, clusters 400 of the RFID tags 300 are formed based on distances between RFID tags 300. Specifically in one embodiment, RFID tags 300 that are closer in distance to each other are formed into the same cluster. Various techniques can be used to determine whether the distance between RFID tags is sufficient or insufficient to justify inclusion of any given RFID tag into a cluster. In one technique, RFID tags are included in the same cluster if the distance between any two of the RFID tags is less than some specified distance. Any RFID tag that exceeds the specified distance to the closest RFID tag of the cluster is rejected for inclusion in the cluster, and is considered instead for inclusion in some other cluster.

In another technique, a particular RFID tag is designated as a central RFID tag $x_i$ for a cluster. Then, the other RFID tags of the cluster are identified and selected based on some specified distance from the central tag $x_i$. For example, RFID tags are included in the same cluster if the distance between such RFID tags and the central RFID tag $x_i$ is less than some specified distance. Any RFID tag that exceeds the specified distance to the central RFID tag $x_i$ of the cluster is rejected for inclusion in the cluster, and is considered instead for inclusion in some other cluster.

Again and as previously explained above, the size, shape, number of RFID tags, etc. of each cluster can dynamically vary from one cluster to another based on various factors. Moreover, it is possible to have a cluster having only a single RFID tag. Such single RFID tag can thus act as its own bridge RFID tag to other clusters.

In an embodiment, each of the clusters previously described above includes at least one active RFID tag and one or more passive RFID tags. In another embodiment, all RFID tags in one or more of the clusters may be passive RFID tags, and one or more devices (such as an automatic data collection device, including RFID readers) can provide the RF field(s) to power such passive RFID tags to perform the various functionalities described herein. In yet other embodiments, some clusters may have one active RFID tag and one or more passive RFID tags, while other clusters may have only passive RFID tags, while still other clusters may have only active RFID tags—all of these clusters have the capability to communicate with each other (directly or indirectly) using the methods described herein.

Figure 5:
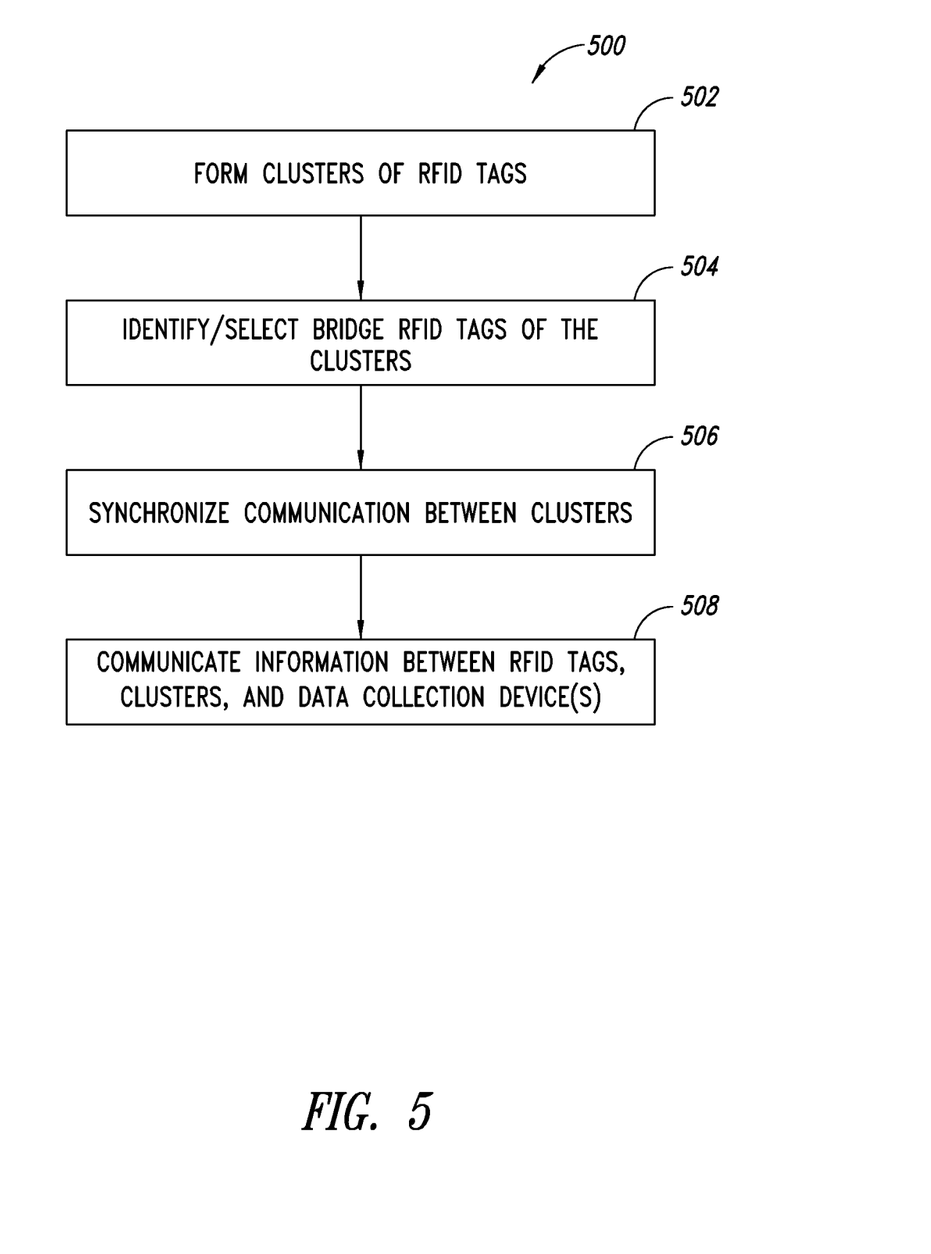
FIG. 5 is a flowchart of an embodiment of a method for stochastic communication between RFID tags, such as the RFID tags shown in FIGS. 1-3.

FIG. 5 is a flowchart of an embodiment of a method 500 to implement the various elements of the stochastic communication protocol described above. It is appreciated that the various operations in the flowchart of FIG. 5 need not necessarily occur in the exact order shown. Moreover, certain operations can be added, removed, modified, or combined.

In some embodiments, certain operations of the method 500 can be implemented in software or other machine-readable instruction stored on a machine-readable medium and executable by a processor. For example, some of the operations in the method 500 can be performed by a data collection device (such as an RFID reader) in one embodiment, using one or more processors and a storage medium of the data collection device.

At a block 502, all of the RFID tags are assigned to a particular cluster that has some RFID tag $x_i$ as a central tag, thereby forming clusters of RFID tags. As described above with reference to FIGS. 3-4, the assignment of tags to a particular cluster can be based on distances between RFID tags. Also as explained above, other criteria can be used to assign RFID tags to specific clusters.

At a block 504, bridge RFID tags are identified and selected. As described above for one embodiment, the identification and selection of bridge RFID tags can be performed based on bridge zones where the emitting power of the particular RFID tag of a first cluster that is sensed by a particular RFID tag of a second cluster exceeds some cumulative power of all RFID tags of the first cluster that is sensed by the particular RFID tag of the second cluster.

At a block 506 for one embodiment, communication between and/or within clusters is synchronized, such as time synchronization of transmission and/or reception. The synchronization can be localized (e.g., synchronization between neighboring RFID tags in a same and/or adjacent clusters) and/or at least partially global (e.g., synchronization between all RFID tags in a same cluster, synchronization between a plurality of clusters, synchronization of all RFID tags of all clusters). In one embodiment, such synchronization can be performed using methods known to persons skilled in the art. Other embodiments can use the synchronization techniques disclosed in U.S. Provisional Patent Application Ser. No. 60/610,759, entitled "SYNCHRONIZATION OF ADAPTIVE SELF-CONFIGURING WIRELESS NETWORK OF TRANSPONDERS," filed Dec. 1, 2004, assigned to the same assignee as the present application, and incorporated herein by reference in its entirety.

One example of such synchronization techniques includes global-based time synchronization in which all RFID tags set time to send/receive data based on a single (e.g., a common) time clock located inside and/or outside of the RFID network. In one embodiment that can implement this synchronization technique, an RFID tag is able to receive data even though such an RFID tag may not necessarily have the capability to communicate the acknowledgement of a successful reception of the data, due to factors such as power constraints. This synchronization technique is used for global synchronization in one embodiment, but can also be adapted for local synchronization.

Another example is time-stamped packet communication in which the packets or other data format received by a recipient RFID tag includes a time of transmission from a sender RFID tag. Embodiments can implement this synchronization technique in a global and/or localized basis.

Yet another example is tag-to-tag synchronization in which the time for transmission/reception is set by an outside system and propagated to the RFID tags. Such propagation can be done by having the RFID tags within and/or between clusters send the time from one RFID tag to another.

A variation to the tag-to-tag synchronization involves an RFID tag (performing managerial duties for its cluster) that sets the time and propagates the time to collaborating neighbor RFID tags. In one embodiment, the central RFID tag $x_i$ can be used as the managerial tag, although other RFID tags in the cluster may also be used as primary and/or backup managerial RFID tags. The cluster's time may be synchronized locally or globally when a tag-to-tag synchronization technique is used.

Still another example of synchronization involves multi-hop time synchronization in which time error is compensated/corrected during propagation of data. In still a further example, RFID tags are capable of identifying a synchronization mode and can start corroboration with neighboring RFID tags in accordance with a proposed synchronization mode. Furthermore, in the case of multiple clusters of RFID tags, RFID tags may reconcile multiple global times to continue an appropriate communication mode.

In other embodiments, the synchronization at the block 506 need not be performed and/or need be performed only on a limited basis. Thus for such embodiments, there need not necessarily be synchronization between RFID tags in a same cluster, between RFID tags of different clusters, between clusters, and/or between other communicating elements of the RFID networks.

At a block 508 in the method 500 of FIG. 5, information is communicated between RFID tags, clusters, and/or data collection device(s) or other device(s). Such communication can be direct or indirect communication within or between clusters using the bridge RFID tags as described above. Specific embodiments of direct tag-to-tag communication that can be implemented in the clusters previously described above will be explained next.

Figure 6:
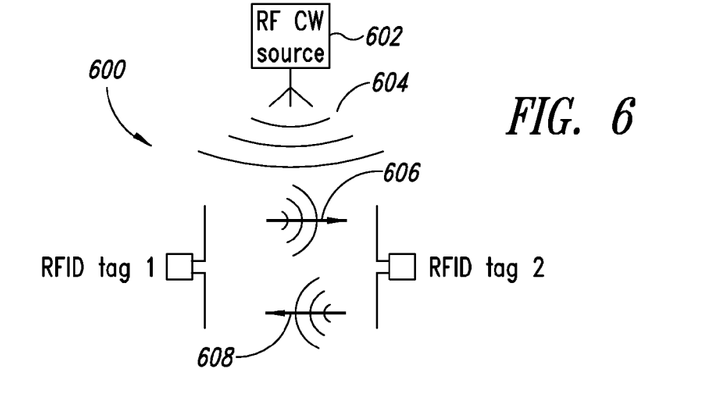
FIG. 6 is a block diagram of an embodiment of a system to provide direct tag-to-tag communication between passive RFID tags of clusters.

More particularly and beginning with FIG. 6, shown generally at 600 is an embodiment of a system 600 for direct tag-to-tag communication between two passive RFID tags 1 and 2. The RFID tags 1 and 2 can comprise two bridge RFID tags of two different clusters described above, or two RFID tags within the same cluster, for instance. Either or both RFID tags 1 and 2 can in turn perform direct tag-to-tag communication with yet other RFID tags in the same cluster and/or with a bridge RFID tag, thereby allowing indirect communication with yet other RFID tags in another cluster.

For embodiments of the system 100 having RFID tags, the system 600 includes an RF carrier wave (RF CW) source 602 that generates a carrier wave 604. The RF CW source 602 can be embodied as an automatic data collection device (such as an RFID reader), a cellular telephone or other portable communication device, another RFID tag, and or any other device(s) or combination thereof that are capable of generating an unmodulated carrier wave 604 that can be used for direct tag-to-tag communication, as well as a power source for the RFID tags 1 and 2. In another embodiment, the carrier wave 604 is output from the RF CW source 602 in a modulated form, and is then further modulated by the RFID tags 1 and 2 during tag-to-tag communication.

In one embodiment, the RF CW source 602 can be switched ON or OFF mechanically (such as by an operator) or electronically (such as in response to a wireless signal). The RF CW source 602 can be powered from a portable battery, thereby providing a portable solution, or from a stationary source of power, for example a 120 V AC voltage supply, thereby providing an industrial solution. Moreover, the RF CW source 602 can be integrated as an operating mode option in a cellular telephone or other device, and produced inexpensively since no frequency stability or digital signal processing capability is used in one embodiment.

An example embodiment of the RF CW source 602 can use a 5 V battery with up to 1 watt of output RF power, using Micro Device's RF2131 power amplifier integrated circuit (IC) with resonant feedback. Additionally in an embodiment, several RC CW sources 602 can be arranged in an array or other pattern so as to cover a large area where clusters of RFID tags are present.

In operation the carrier wave 604 is backscattered, and the RFID tags 1 and 2 can communicate with each other by modulating the backscattered carrier wave 604. Thus, the RFID tag 1 can send an interrogation signal 606 to the RFID tag 2, and the RFID tag 2 can reply to the interrogation signal 606 with a reply signal 608, and/or vice versa. The interrogation signal 606 and the return signal 608 are thus the modulated backscattered carrier wave 604. The interrogation signal 606 and the return signal 608 can be demodulated by the RFID tags 2 and 1, respectively, to obtain the data encoded therein.

The method of communication of FIG. 6 can be analogized by an example of two persons in a dark room. When a light in the room if OFF, the two persons cannot see each other in the dark. When the light in the room is ON, the two persons can see each other and remember each other's appearance because of photons of light that reflect from them and make them visible to each other. In an analogous way, the two passive RFID tags 1 and 2 cannot communicate with each other in the absence of the carrier wave 604, but in the presence of the carrier wave 604, the two RFID tags 1 and 2 can communicate with each other by modulating the backscattered carrier wave 604.

Figure 7:
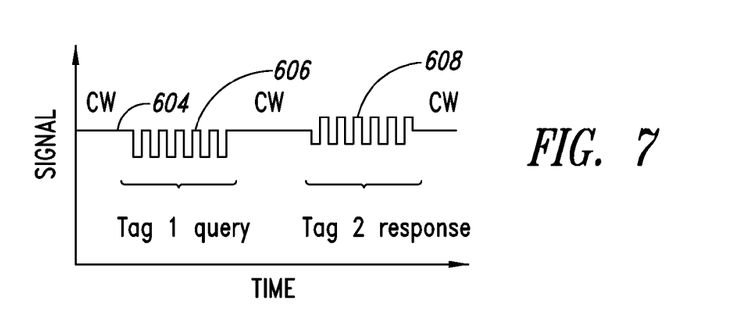
FIG. 7 is a schematic diagram illustratively showing modulation of a carrier wave (CW) by an embodiment of the system of FIG. 6 for direct tag-to-tag communication between passive RFID tags of clusters.

Example waveforms at terminals of the RFID tags 1 and 2 during tag-to-tag communication are illustrated in FIG. 7. It is appreciated that such illustrated waveforms are not intended to be precisely depicted in shape, frequency, amplitude, timing, etc. in FIG. 7, but are rather intended to be drawn for the purpose of clarity of explanation.

The carrier wave 604 is depicted in FIG. 7 as a signal of constant amplitude during periods of time when the carrier wave 604 is not being modulated by the RFID tags 1 and 2. During a period of time when the RFID tag 1 generates and sends the interrogation signal 606 to the RFID tag 2, FIG. 7 depicts the modulation of the carrier wave 604 as a square wave pulse train. Similarly, during a period of time when the RFID tag 2 generates and sends the return signal 608 to the RFID tag 1, FIG. 7 depicts the modulation of the carrier wave 604 as another square wave pulse train.

Figure 8:
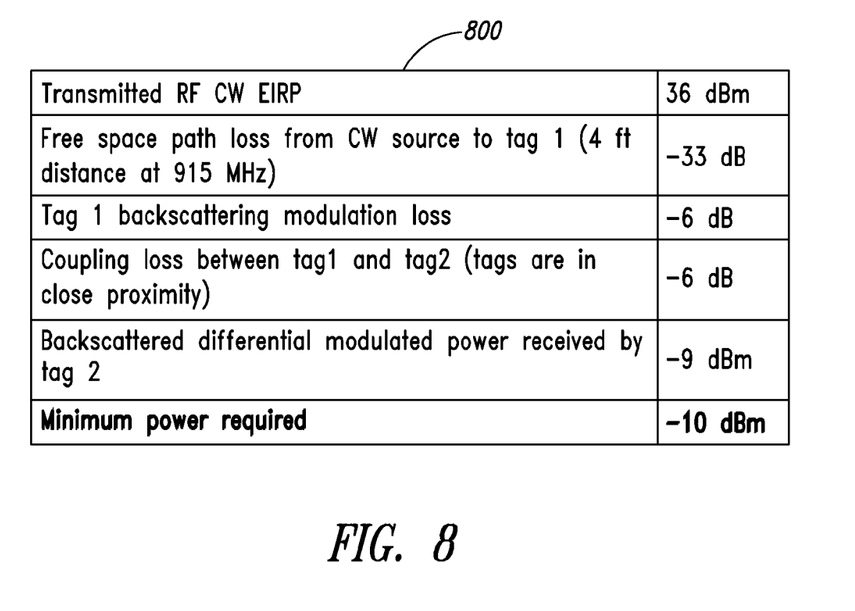
FIG. 8 is a table showing example power levels associated with direct tag-to-tag communication between RFID tags of clusters.

FIG. 8 is a table 800 showing example power budget values for the tag-to-tag communication described above. It is appreciated that the various power values shown in the table 800 are merely for the purpose of illustration, and that other embodiments may involve different power values.

The RF CW source 602 is assumed to output the carrier wave 604 with a power value of +36 dBm. The free space path loss from the RF CW source 602 to the RFID tag 1 (assuming a distance of 4 feet between the RF CW source 602 and the RFID tag 1, with a 915 MHz frequency for the carrier wave 604) is −33 dB, thereby leaving +3 dBm of power available. There is then a backscattering modulation loss of −6 dB associated with the RFID tag 1, as well as a coupling loss of −6 dB between the RFID tags 1 and 2 in close proximity. The resulting backscattering differential modulated power received by the RFID tag 2 is thus −9 dBm. If the minimum power required for tag-to-tag communication is −10 dBm, then the resultant −9 dBm power is sufficient to meet operational requirements.

In one embodiment, the carrier wave 604 from the RF CW source 602 comprises an interrogation signal that both powers and interrogates the RFID tag 1 and/or the RFID tag 2. Such an interrogation signal can then be modulated by the RFID tag 1 and/or the RFID tag 2 in the manner described above, thereby providing tag-to-tag communication capabilities in existing passive RFID networks/systems.

In another embodiment, one of the RFID tags (such as the RFID tag 2) can comprise a passive RFID tag with capabilities to receive interrogation signals and to send return signals, and another one of the RFID tags (such as the RFID tag 1) can comprise a passive RFID tag having additional capability to independently broadcast or otherwise issue tag queries (i.e., interrogation signals), alternatively or additionally to using the carrier wave 604 for such tag queries. Such an embodiment of the RFID tag 1 obtains power from the carrier wave 604 (or from some other source) and then waits for the RF CW source 602 to transmit an interrogation signal, which may be in the form of a modulation of the carrier wave 604 and/or the issuance of another signal. If the RFID tag 1 does not receive any interrogation signals from the RF CW source 1 within a period of time, then the RFID tag 1 starts to periodically broadcast (such as by backscattering) interrogation signals itself to the RFID tag 2 and/or to other RFID tags. Such interrogation signals can comprise a modulated or unmodulated carrier wave similar to the carrier wave 604, in one embodiment.

In another embodiment, both the RFID tags 1 and 2 can have the capability to issue interrogation signals. In still further embodiments, RFID tags of the various clusters can comprise a mix of RFID tags with or without this additional capability to issue interrogation signals.

Figure 9:
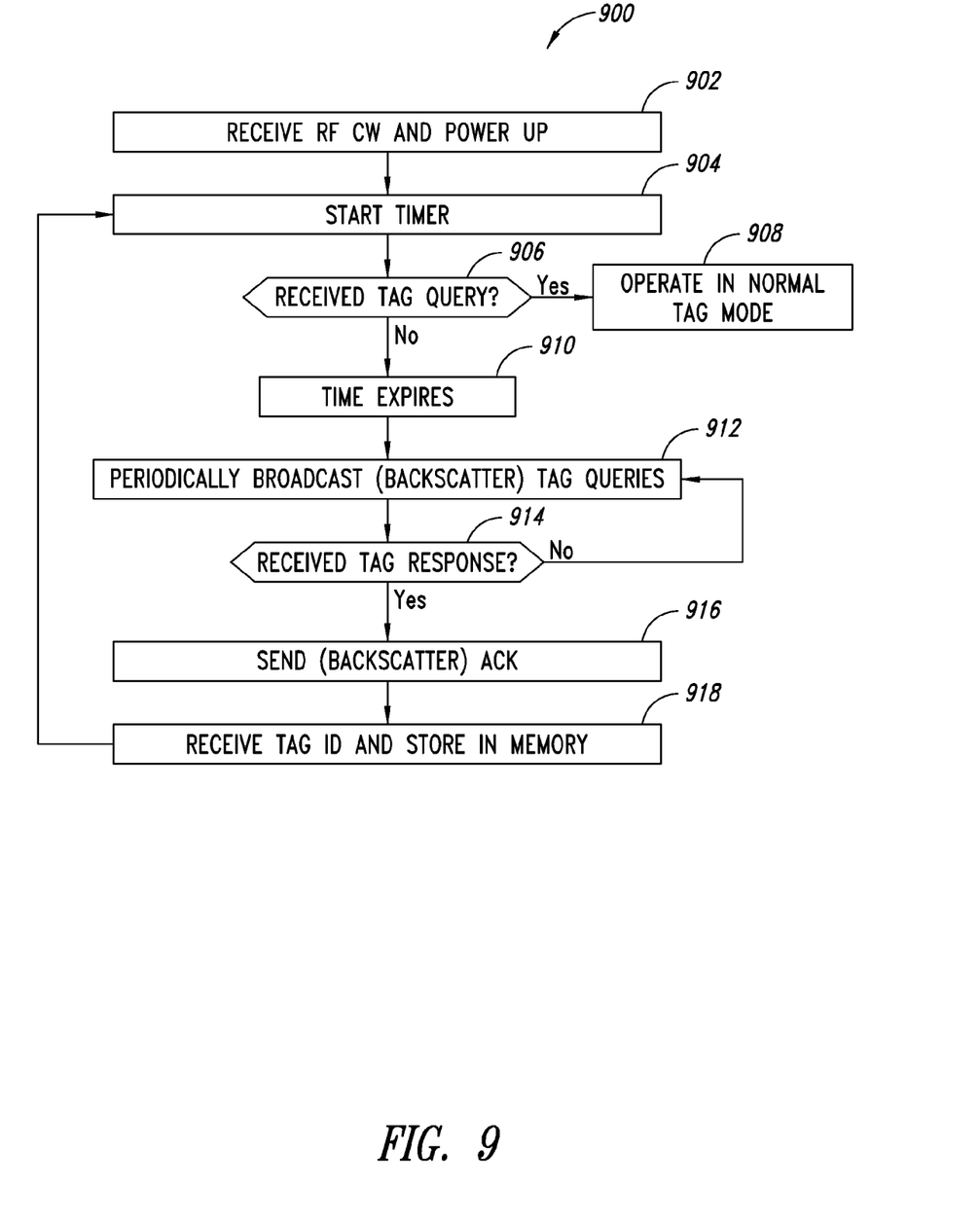
FIG. 9 is a flowchart of an embodiment of a method that can be implemented in the system of FIG. 6 for direct tag-to-tag communication between passive RFID tags of clusters.

FIG. 9 is a flowchart of a method 900 for direct tag-to-tag communication in which one of the RFID tags (such as the RFID tag 1 for purposes of illustration) has capability to issue interrogation signals. It is appreciated that the various operations in the flowchart of FIG. 9 need not necessarily occur in the exact order shown. Moreover, certain operations can be added, removed, modified, or combined.

In some embodiments, certain operations of the method 900 can be implemented in software or other machine-readable instruction stored on a machine-readable medium and executable by a processor. For example, some of the operations in the method 900 can be performed by one or more controllers or other processor(s) and a storage medium in an RFID tag.

At a block 902, the RFID tags 1 and 2 receive the carrier wave 604 from the RF CW source 602 and power up. A timer in the RFID tag 1 is started at a block 904. If the RFID tag 1 receives an interrogation signal at a block 906 from the RF CW source 602 and/or from some other querying device, then the RFID tag 908 operates in a normal tag mode at a block 908, such as by generating and sending an appropriate return signal to the querying device(s).

However, if the timer expires at a block 910 and the RFID tag 1 has not received an interrogation signal at the block 906, then the RFID tag 1 sends one or more interrogation signals or other types of queries at a block 912 to an RFID tag (such as the RFID tag 2). In one embodiment, the queries at the block 912 are broadcast periodically, such as by backscattering. In other embodiments, the queries need not necessarily be sent in a periodical manner, and can be sent in a somewhat random manner, for example.

If the RFID tag 1 does not receive any return signals or other response(s) to the queries at a block 914, then the RFID tag 1 continues to issue queries at the block 912. However, if the RFID tag 1 receives one or more responses at the block 914, then the RFID tag 1 generates and sends back (such as by backscattering) a corresponding one or more acknowledgements at a block 916.

At a block 918, the RFID tag 1 receives an RFID tag identifier (such as the identifier for the RFID tag 2) from the RFID tag 2 during the direct tag-to-tag communication and stores this received RFID tag identifier in memory. The method 900 then repeats at the block 904 in which the timer of the RFID tag 1 is restarted as the RFID tag 1 monitors for additional tag queries.

Figure 10:
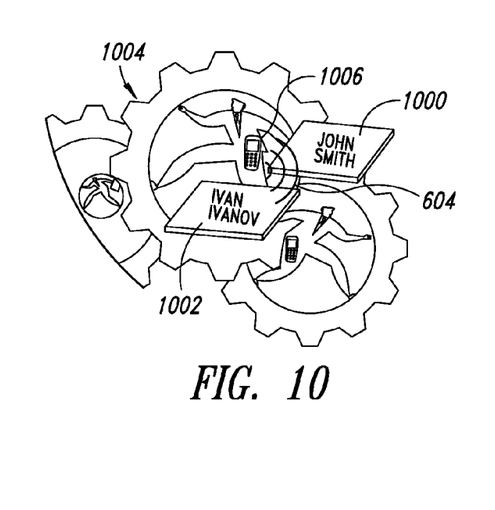
FIGS. 10-12 are schematic diagrams that show example implementations for direct tag-to-tag communication between passive RFID tags of clusters.
Figure 11:
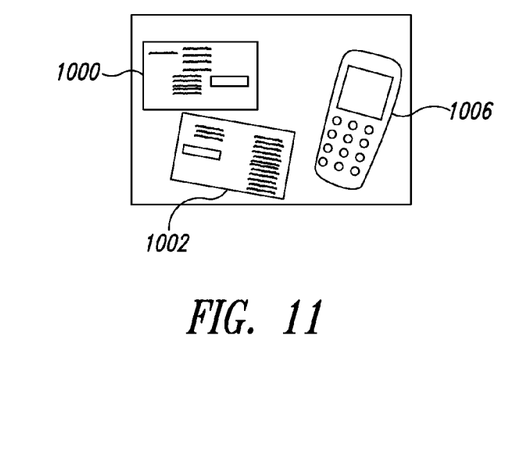
Figure 12:
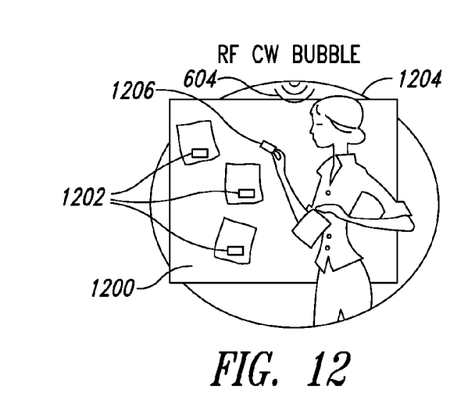

FIGS. 10-12 show various example implementations for direct tag-to-tag communication where RFID tags (or other types of data carriers, such as acoustical tags) are arranged in clusters. It is appreciated that such implementations are not intended to be exhaustive of all the possible implementations for direct tag-to-tag communication.

The implementation illustrated in FIG. 10 involves direct exchange of information, without the use of a dedicated automatic data collection device such as an RFID reader, between documents embedded with passive RFID tags containing information pertaining to the documents. Examples of such documents as illustrated in FIG. 10 are business cards 1000 and 1002, such that the passive RFID tags embedded therein contain business card information.

The exchange of business card information can be performed if there is an area 1004 where the carrier wave 604 is present to energize the RFID tags embedded in the business cards 1000 and 1002. The area 1004 can be an area in a conference center, for example, is covered by the carrier wave 604 generated by the RF CW source 602. Alternatively or additionally, the carrier wave 604 can be generated from a device such as a cellular telephone 1006 or other device capable to generate the carrier wave 604. In one embodiment, the cellular telephone 1006 can be a conventional cellular telephone that does not require modification in order to generate the carrier wave 604.

FIG. 11 further illustrates the implementation shown in FIG. 10. Two persons need to quickly and conveniently exchange business card information. One of these persons pushes a button on the cellular telephone 1006 to create a "bubble" or other area proximate to the business cards 1000 and 1002 to be covered by the carrier wave 604. By pressing the button or otherwise appropriately actuating the cellular telephone 1006, the cellular telephone 10056 can operate in an RF CW mode. The "bubble" can be present for a few seconds or any other suitable length of time sufficient to allow the RFID tags of the business cards 1000 and 1002 to conduct tag-to-tag communication.

The two persons can "rub" their business cards 1000 and 1002 together, or otherwise place the business cards 1000 and 100 in close proximity to each other, in order to conduct the tag-to-tag communication to exchange and store business card information of the other person. The two persons can then go their separate ways, and can later retrieve the stored business card information (such as at home, at the office, or at some other location). The business card information stored in the embedded RFID tag of the business cards 1000 and 1002 can be retrieved at such other locations using an automatic data collection device (such as an RFID reader), a personal computer of laptop with RFID-reading capability, or other device capable to read RFID tags.

In the example of FIG. 12, a person approaches a bulletin board 1200 having advertisements 1202 present thereon. The advertisements 1202 have passive RFID tags that contain information pertaining to each advertisement 1202. An area 1204 ("bubble") encompassing the bulletin board 1200 is covered by the carrier wave 604 from the RF CW source 602, which could be a stationary device placed proximate to the bulletin board 1200, a cellular telephone of the person, or some other device.

The person can read the information from selected advertisements 1202 using a personal passive RFID tag 1206, such as by "swiping" the RFID tag 1206 over the selected advertisement(s) 1202. The information read from the RFID tags of the advertisements 1202 can then be stored by the RFID tag 1206 of the person for later review or other use.

In an embodiment, the RFID tag 1206 of the user can be embedded in a business card or other object, in a handheld device portable communication device (such as a cellular telephone, pager, PDA, Blackberry, Palm Pilot, etc.), or some other compact and portable apparatus that can be conveniently carried by the person and usable to "swipe" over one or more RFID tags or other target data carriers.

Figure 13:
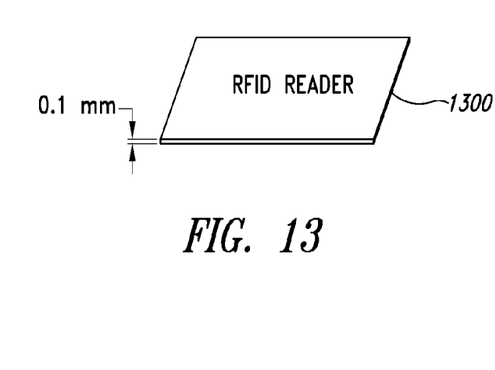
FIG. 13 is a schematic diagram that shows an embodiment of an apparatus with RFID reading capability that is usable for direct tag-to-tag communication between passive RFID tags of clusters.

An embodiment of such an apparatus having the RFID tag for reading other RFID tags is shown at 1300 in FIG. 13. The apparatus 1300 can be a "paper thin" batteryless RFID reader, with an example thickness of 0.1 mm. The apparatus 1300 of one embodiment comprises a passive RFID tag having capability to issue interrogation or other query signals in accordance with the embodiment of the method 900 shown in FIG. 9. The apparatus 1300 of one embodiment can be provided with sufficient memory capacity to store information from a large number of RFID tags that are read. The stored information can later be retrieved from the apparatus 1300 using an RFID reader or other suitable automatic data collection device.

Advantages of the apparatus 1300 are compact size, lightweight, batteryless, and relatively inexpensive (for example, less than a few dollars each). Moreover, such an apparatus 1300 can operate anywhere in a vicinity of RFID tags that are covered by the carrier wave 604 generated by the RF CW source 602.

Accordingly from the various embodiments of the RFID clusters and tag-to-tag communication techniques between RFID tags of such clusters described above, it is clear that such embodiments can be used for real time applications and/or to meet other application requirements. Additional advantages of such embodiments can further include, but not be limited to, indifference to RFID network topology changes (e.g., adaptive and self-configuring clusters), energy efficient functionality, extended range for automatic data collection device or other device for collecting data (since tags can communicate directly or indirectly with each other using bridge tags), thereby extending the range for reading tags), self-organizing capability, and so forth.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, embodiments have been described above in which the RFID tags are attached to objects, and provide data pertaining to the objects. In other embodiments, the RFID tags may be provided with sensor elements, such that the RFID tags can detect and collect data regarding temperature, humidity, air pressure, lighting levels, presence of certain chemical substances, presence and strength of electromagnetic or other types of signals, or other environmental condition that can be sensed and stored by the RFID tags. Such detected and collected data can then be provided to one or more RFID readers and/or to other RFID tags using the techniques described above.

Furthermore, various embodiments have been described above in the context of the data carrier being in the form of an RFID tag. It is appreciated that other embodiments can be provided for use with other types of data carriers, such as acoustical tags. In such other embodiments, the carrier wave (CW) can be in the form of an acoustical wave. Further in such embodiments, the acoustical tags can be formed into clusters and can communicate with each other in a manner analogous to the techniques described above. Further, various systems can include clusters formed entirely of acoustical tags; clusters formed from a mix of acoustical tags, RFID tags, and/or other types of tags; and/or clusters formed from various other combinations of tag types that can communicate with similarly or differently formed clusters.

In the embodiments described above, various signals (such as the carrier wave 604) have been described as being an RF signal. It is understood that the RF signal(s) can be included in at least the radio band and microwave band of frequencies.

These and other modifications can be made to the embodiments in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of forming and communicating among a number of data carrier clusters in an environment including a plurality of data carriers, the method comprising:

grouping each of at least a portion of the plurality of data carriers into one of the number of data carrier clusters based at least in part on a first signal parameter of a signal generated by each of the respective data carriers meeting at least one defined clustering criteria as determined by another of the plurality of data carriers grouped in the one of the number of data carrier clusters, each of the data carriers grouped in the one of the number of data carrier clusters operable to directly wirelessly communicate only with another data carrier grouped in the same data carrier cluster; and for each of the number of data carrier clusters, selecting at least one of the data carriers of the respective data carrier cluster as a bridge data carrier based at least in part on at least a first signal strength of the signal generated by the bridge data carrier exceeding the sum of at least a portion of first signal strengths of the other data carriers grouped in the same data carrier cluster as the bridge data carrier, the first signal strengths as determined by at least the portion of the data carriers in at least one other of the number of data carrier clusters, the bridge data carrier to provide wireless communications for the other data carriers in the respective data carrier cluster indirectly with the other data carriers of at least one other of the number of data carrier clusters.

2. The method of claim 1 wherein selecting at least one of the data carriers of the respective data carrier cluster as a bridge data carrier to provide wireless communications for the other data carriers in the respective data carrier cluster indirectly with the other data carriers of at least one other of the number of data carrier clusters, includes:

selecting at least one of the data carriers in one of the number of data carrier clusters as a bridge data carrier to provide indirect wireless communications for the other data carriers in the respective data carrier cluster with one or more data carriers in the one other of the number of data carrier clusters via a communicable coupling between the bridge data carrier grouped in the respective data carrier cluster and a different bridge data carrier grouped in the one other of the number of data carrier clusters.

3. The method of claim 2 wherein selecting at least one of the data carriers of the respective data carrier cluster as a bridge data carrier, includes:

selecting the bridge data carrier using at least one defined bridge selection criteria based on at least the first signal parameter of the signal generated by the bridge data carrier as received by at least a portion of the data carriers grouped in the one other of the number of data carrier clusters.

4. The method of claim 1, further comprising:

creating a number of coalitions of communicably coupled data carriers, each of the number of coalitions including at least one of: at least two directly communicably coupled data carriers in a same one of the number of data carrier clusters, at least two data carriers in the same one of the number of data carrier clusters indirectly communicably coupled through at least one intermediary data carrier in the same one of the number of data carrier clusters, or at least two data carriers in different ones of the number of data carrier clusters communicably coupled via the bridge data carrier in each of the respective ones of the number of data carrier clusters.

5. The method of claim 4, further comprising:

selecting by at least a portion of the number of data carriers in one of the number of data carrier clusters at least one data carrier grouped in the one of the number of data carrier clusters as a managerial data carrier; and propagating to at least a portion of the number of data carriers in the one of the number of data carrier clusters at least one of: a timing signal or a synchronization signal via one or more managerial signals generated by the managerial data carrier.

6. The method of claim 1, further comprising:

communicably coupling a first data carrier in a first data carrier cluster with a first bridge data carrier in the first data cluster;

communicably coupling a second data carrier in a second data carrier cluster with a second bridge data carrier in the second data cluster; and communicably coupling a first data carrier in a first data carrier cluster with a second data carrier in a second data carrier cluster by communicably coupling the first bridge data carrier with the second bridge carrier.

7. The method of claim 1 wherein grouping each of the portion of the plurality of data carriers into one of the number of data carrier clusters based at least in part on a first signal parameter of a signal generated by the respective data carrier meeting at least one defined clustering criteria as determined by another of the plurality of data carriers grouped in the one of the number of data carrier clusters, includes:

grouping each of the portion of the plurality of data carriers into one of a number of data carrier clusters based at least in part on at least one of: a first signal strength of the signal generated by the respective data carrier or a first signal frequency of the signal generated by the respective data carrier meeting a respective first signal strength criteria or first signal frequency criteria as determined by another of the plurality of data carriers grouped in the one of the number of data carrier clusters.

8. The method of claim 1 wherein the first signal parameter includes information indicative of a geographic location of the respective data carrier; and wherein grouping each of the portion of the plurality of data carriers into one of the number of data carrier clusters based at least in part on a first signal parameter of a signal generated by the respective data carrier meeting at least one defined clustering criteria as determined by another of the plurality of data carriers grouped in the one of the number of data carrier clusters, includes:

grouping each of the portion of the plurality of data carriers in one of a number of data carrier clusters based at least in part on the geographic location of the respective data carrier meeting at least one of: a geographic location criteria or a distance from a defined location criteria as determined by another of the plurality of data carriers grouped in the one of the number of data carrier clusters.

9. The method of claim 1, further comprising:

energizing at least a portion of the plurality of data carriers using a power storage device carried by each of the respective portion of the plurality of data carriers; and responsive to energizing, transmitting the signal having the first signal parameter each of the plurality of data carriers.

10. The method of claim 2, further comprising:

energizing at least a portion of the plurality of data carriers using a carrier wave source external to the plurality of data carriers; and responsive to energizing, transmitting the signal having the first signal parameter each of the plurality of data carriers, wherein the signal having the first signal parameter comprises a backscatter signal generated by each of the plurality of data carriers.

11. A system to form and communicate among a number of data carrier clusters in an environment having a plurality of data carriers, the system comprising:

a plurality of data carriers, each including:
an antenna;
a nontransitory storage medium including parametric data associated with the data carrier; and
a controller communicably coupled to the antenna and the nontransitory storage medium, that:
autonomously forms a data carrier cluster with other data carriers that provide a signal having a first parameter that meets at least one defined clustering criteria;
communicates directly only with other of the plurality of data carriers grouped in the same data carrier cluster; and
communicates indirectly through a bridge data carrier grouped in the same data carrier cluster with those of the plurality of data carriers grouped in other data carrier clusters, the bridge data carrier selected based at least in part on at least a first signal strength of the signal generated by the bridge data carrier exceeding the sum of at least a portion of first signal strengths of the other data carriers grouped in the same data carrier cluster as the bridge data carrier, the first signal strengths as determined by at least the portion of the data carriers in at least one other of the number of data carrier clusters.

12. The system of claim 11 wherein the controller further:

selects from within the data carrier cluster, a managerial data carrier; and autonomously synchronizes at least a portion of the signal provided by the data carrier with at least one of: a timing signal provided by the managerial data carrier or a synchronization signal provided by the managerial data carrier.

13. The system of claim 12 wherein the controller further: communicates to at least a portion of the data carriers grouped in the data carrier cluster at least a portion of at least one of: the timing signal provided by the managerial data carrier or the synchronization signal provided by the managerial data carrier.

14. The system of claim 12 wherein the controller further: creates at least one coalition with at least one other communicably coupled data carrier.

15. The system of claim 14 where in the data carrier creates the at least one coalition with at least one of: a directly communicably coupled data carrier in the data carrier cluster; an indirectly communicably coupled data carrier in the data carrier cluster that is communicably coupled to at least one intervening data carrier in the data carrier cluster; or an indirectly communicably coupled data carrier in a different data carrier cluster that is communicably coupled to at least the bridge data carrier in the different data carrier cluster.

16. The system of claim 11 wherein the at least one defined clustering criteria includes at least one of: a signal strength of the signal generated by another data carrier as determined by the data carrier or a signal frequency of the signal generated by another data carrier as determined by the data carrier.

17. The system of claim 11 wherein data indicative of one or more identifiers associated with each of the other data carriers at least in the data carrier cluster are stored in the nontransitory storage medium.

18. The system of claim 11 wherein at least a portion of the data indicative of the defined clustering criteria is stored in the nontransitory storage medium.

19. The system of claim 11 wherein each of the plurality of data carriers comprises a radio frequency identification (RFID) tag.

20. The system of claim 19 wherein at least a portion of the plurality of data carriers comprises an active radio frequency identification (RFID) tag.

21. The system of claim 19 wherein at least a portion of the plurality of data carriers comprises a passive radio frequency identification (RFID) tag.

22. The system of claim 21 wherein the at least a portion of the data carriers grouped in the data carrier cluster are communicably coupled via one or more backscatter signals generated by each of the respective portion of data carriers.

* * * * *